US012374484B2

(12) United States Patent
Takamatsu et al.

(10) Patent No.: US 12,374,484 B2
(45) Date of Patent: Jul. 29, 2025

(54) HIGH-FREQUENCY INDUCTOR COMPONENT

(71) Applicant: Murata Manufacturing Co., Ltd., Kyoto-fu (JP)

(72) Inventors: Tsuyoshi Takamatsu, Nagaokakyo (JP); Keiichi Yoshinaka, Nagaokakyo (JP); Minoru Matsunaga, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 976 days.

(21) Appl. No.: 17/477,480

(22) Filed: Sep. 16, 2021

(65) Prior Publication Data

US 2022/0115171 A1 Apr. 14, 2022

(30) Foreign Application Priority Data

Oct. 13, 2020 (JP) ................................ 2020-172763

(51) Int. Cl.

| | |
|---|---|
| ***H01F 5/00*** | (2006.01) |
| ***H01F 17/00*** | (2006.01) |
| ***H01F 17/04*** | (2006.01) |
| ***H01F 27/28*** | (2006.01) |
| ***H01F 27/32*** | (2006.01) |
| *H01F 41/04* | (2006.01) |

(52) U.S. Cl.

CPC ......... *H01F 17/0013* (2013.01); *H01F 17/04* (2013.01); *H01F 27/2804* (2013.01); *H01F 27/32* (2013.01); *H01F 2017/048* (2013.01); *H01F 41/041* (2013.01)

(58) Field of Classification Search

CPC .................................................. H01F 27/2804

USPC .......................................................... 336/200

See application file for complete search history.

(56) References Cited

U.S. PATENT DOCUMENTS 4,117,588 A * 10/1978 Johnson ............... H05K 3/4614 336/200
2017/0103846 A1* 4/2017 Yoneda ................. H01F 41/043
2017/0110234 A1* 4/2017 Nishikawa .......... H01F 41/0206

FOREIGN PATENT DOCUMENTS

| | | |
|---|---|---|
| CN | 216957629 U | 7/2022 |
| JP | H09-167703 A | 6/1997 |
| JP | H11-103531 A | 4/1999 |

(Continued)

*Primary Examiner* — Ronald Hinson
(74) *Attorney, Agent, or Firm* — Studebaker Brackett PLLC

(57) ABSTRACT

A high-frequency inductor component comprises an element body; a coil within the element body and having a helical structure in which the coil is wound along an axial direction; and first and second external electrodes on the element body and electrically connected to the coil. The element body includes first and second end surfaces that face each other and a bottom surface connected between these end surfaces. The first and second external electrodes are respectively formed from the first and second end surfaces to the bottom surface. The element body includes an insulating layer of a non-magnetic material, and internal and external magnetic members containing a magnetic material. The internal magnetic member lies where the coil is present in the axial direction, and the external magnetic member lies outside of the coil in the axial direction. The inductor component has an inductance value of 100 nH or less.

20 Claims, 11 Drawing Sheets

(56) References Cited

FOREIGN PATENT DOCUMENTS

| | | | |
|---|---|---|---|
| JP | 2015-015297 | A | 1/2015 |
| JP | 2016-225604 | A | 12/2016 |
| JP | 2017-076735 | A | 4/2017 |
| JP | 2017-103423 | A | 6/2017 |
| JP | 2020-013952 | A | 1/2020 |

* cited by examiner

HIGH-FREQUENCY INDUCTOR COMPONENT

CROSS REFERENCE TO RELATED APPLICATION

This application claims benefit of priority to Japanese Patent Application 2020-172763, filed Oct. 13, 2020, the entire content of which is incorporated herein by reference.

BACKGROUND

Technical Field

The present disclosure relates to a high-frequency inductor component.

Background Art

An example of conventional inductor components is one described in JP2015-015297A. This inductor component includes an element body, a coil disposed within the element body, a first external electrode, and a second external electrode. The coil is formed by forming a coil conductor layer on an insulating paste layer; laminating such insulating paste; and then firing it.

SUMMARY

In the case of using at high frequencies, it was difficult for the above inductor component to improve Q value if the acquisition efficiency of L value per external size is improved in order to acquire a required inductance value (L value) while supporting miniaturization. Thus, the present disclosure provides a high-frequency inductor component capable of improving the Q value while improving the acquisition efficiency of the L value.

Accordingly, a high-frequency inductor component as an aspect of the present disclosure comprises an element body; a coil disposed within the element body and having a helical structure in which the coil is wound along an axial direction; and a first external electrode and a second external electrode that are disposed on the element body and electrically connected to the coil. The element body includes a first end surface and a second end surface that face each other and a bottom surface connected between the first end surface and the second end surface. The first external electrode is formed from the first end surface to the bottom surface, and the second external electrode is formed from the second end surface to the bottom surface. The element body includes an insulating layer made of a non-magnetic material and an internal magnetic member and an external magnetic member that contain a magnetic material. The internal magnetic member lies at a position where the coil is present in the axial direction, the external magnetic member lies outside of the coil in the axial direction, and the inductor component has an inductance value of 100 nH or less.

According to the above aspect, in the high-frequency inductor component, the Q value can be improved while improving the acquisition efficiency of the L value. In an embodiment of the high-frequency inductor component, the coil contains Ag, and the insulating layer contains glass. In an embodiment of the high-frequency inductor component, the axial direction is parallel to the bottom surface. Also, in an embodiment of the high-frequency inductor component, the inductor component has a dimension of less than 0.7 mm in a direction parallel to the bottom surface and perpendicular to the axial direction, and has a dimension of less than 0.4 mm in the axial direction. According to the embodiment, a mode preferable as the high-frequency inductor can be achieved.

In an embodiment of the high-frequency inductor component, the dimension of the inductor component in a direction perpendicular to the bottom surface is larger than the dimension of the inductor component in the axial direction. According to the above embodiment, the diameter of the coil can be increased. In an embodiment of the high-frequency inductor component, the internal magnetic member and the external magnetic member are a composite of resin and the magnetic material.

According to the above embodiment, the L value acquisition efficiency can further be improved.

In an embodiment of the high-frequency inductor component, the magnetic material includes at least one of Co-based ferrite, hexagonal ferrite, and magnetic metal powder with a particle diameter of 1 μm or less.

According to the embodiment, the high-frequency characteristics can be kept while improving the Q value of the inductor component, due to less magnetic loss up to high frequencies as compared with the case of using a general magnetic material such as Ni—Zn ferrite.

In an embodiment of the high-frequency inductor component, the first external electrode and the second external electrode are embedded in the element body, and the coil has a plurality of coil windings juxtaposed in the axial direction and each wound in a direction perpendicular to the axial direction. Also, the area of the insulating layer is larger than the total area of the coil wirings, the first external electrode, and the second external electrode in a section perpendicular to the axial direction and including the coil wirings, the first external electrode, and the second external electrode.

According to the embodiment, the area of the coil and the external electrodes can be reduced, so that it becomes possible to suppress lowering of the Q value and lowering of self-resonant frequency (SRF) at high frequencies due to magnetic loss.

In an embodiment of the high-frequency inductor component, when the element body and the coil are projected in the axial direction, the shortest distance between the internal magnetic member and the coil is 10 μm or more and 20 μm or less (i.e., from 10 μm to 20 μm).

According to the embodiment, short circuit and current leakage can be suppressed by securing the distance between the coil and the internal magnetic member.

In an embodiment of the high-frequency inductor component, the internal magnetic member lies only on the inner diameter side of the coil.

According to the embodiment, since the internal magnetic member is not present between the coil and the external electrode, lowering of SRF can be suppressed. Furthermore, since the exterior of the coil is formed integrally with the insulating layer, the strength of the inductor component becomes higher. In addition, due to absence of the internal magnetic member outside of the coil, the coil diameter can be increased.

In an embodiment of the high-frequency inductor component, the element body includes a third end surface and a fourth end surface that are perpendicular to the first end surface and the bottom surface and that face each other, the axial direction is parallel to the bottom surface and intersects the third end surface and the fourth end surface, and the external magnetic member constitutes the third end surface and the fourth end surface.

According to the embodiment, another member need not be disposed on the magnetic member, enabling the element body to be reduced in size.

In an embodiment of the high-frequency inductor component, the axial direction is parallel to the bottom surface and the first end surface, the element body includes a top surface facing the bottom surface, and the external magnetic member extends over the insulating layer on at least one of the bottom surface, the top surface, the first end surface, and the second end surface.

According to the embodiment, the degree of adhesion between the external magnetic member and the element body is enhanced.

In an embodiment of the high-frequency inductor component, when the element body and the coil are projected in the axial direction, the internal magnetic member has a shape extending along the coil.

According to the embodiment, the internal magnetic member can be increased in size.

In an embodiment of the high-frequency inductor component, the self-resonant frequency is 1 GH or more.

According to the above aspects, a high-frequency inductor component can be provided that is capable of improving the Q value while improving the acquisition efficiency of the L value.

DETAILED DESCRIPTION

An inductor component as an aspect of the present disclosure will now be described in more detail with reference to embodiments shown. The drawings are partly schematic and may not reflect the actual dimensions or ratios.

First Embodiment

Figure 1:
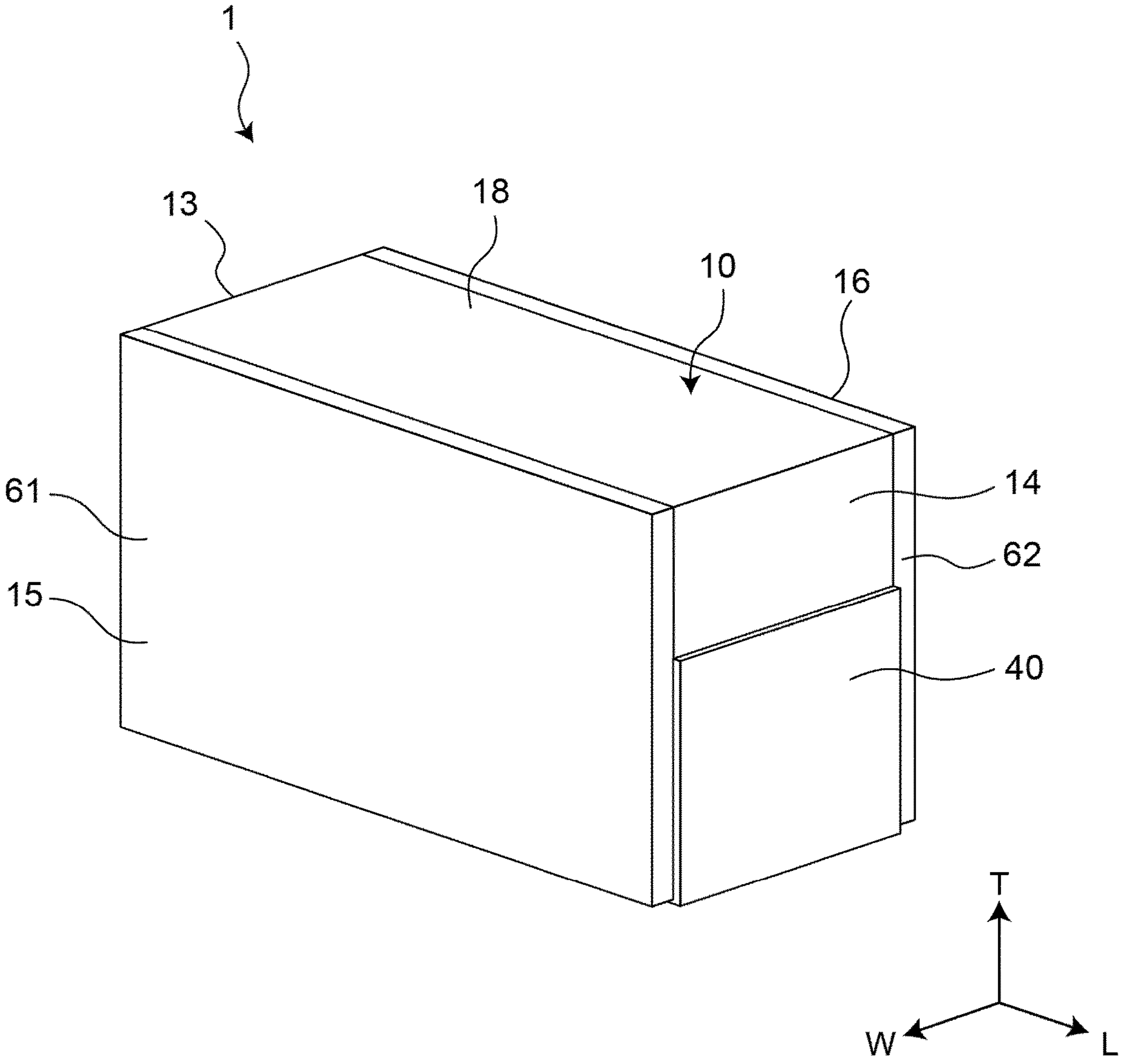
FIG. 1 is a perspective view showing an embodiment of an inductor component.
Figure 2:
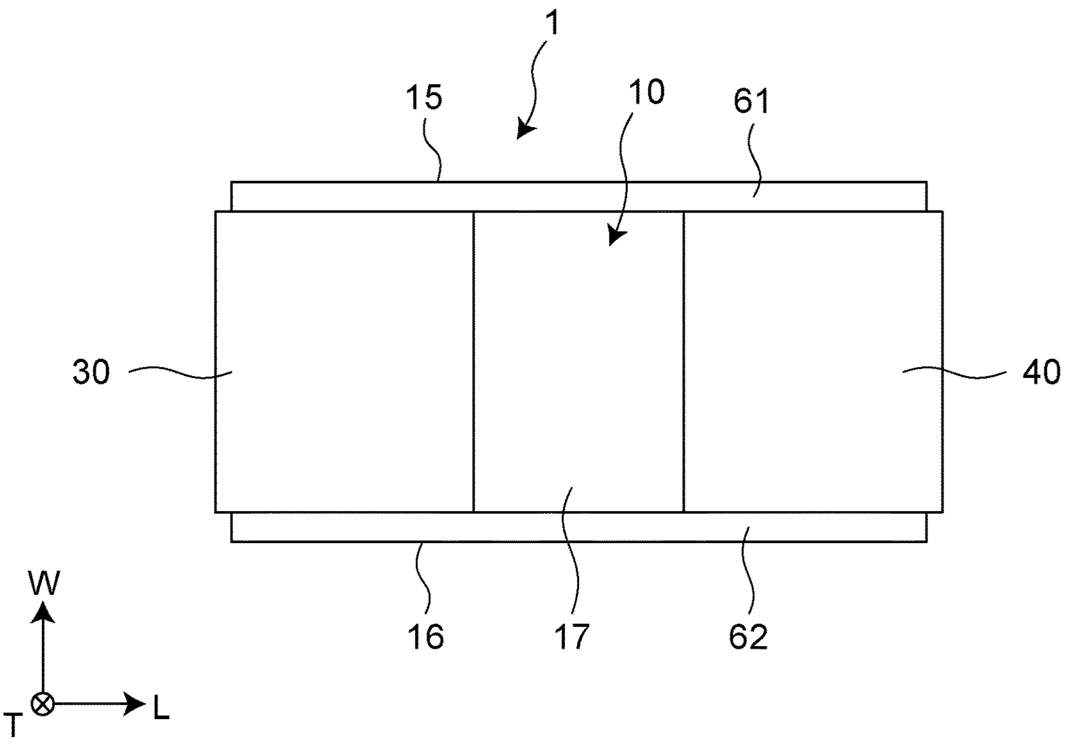
FIG. 2 is a bottom view of the inductor component.
Figure 3:
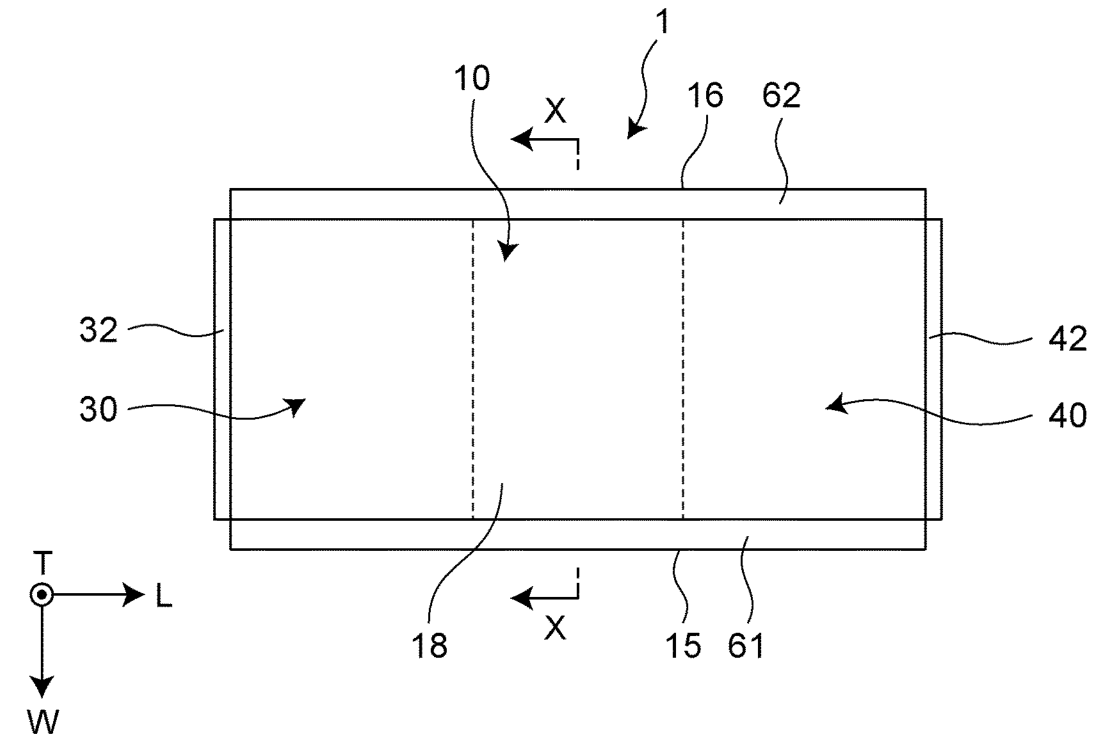
FIG. 3 is a top view of the inductor component.
Figure 4:
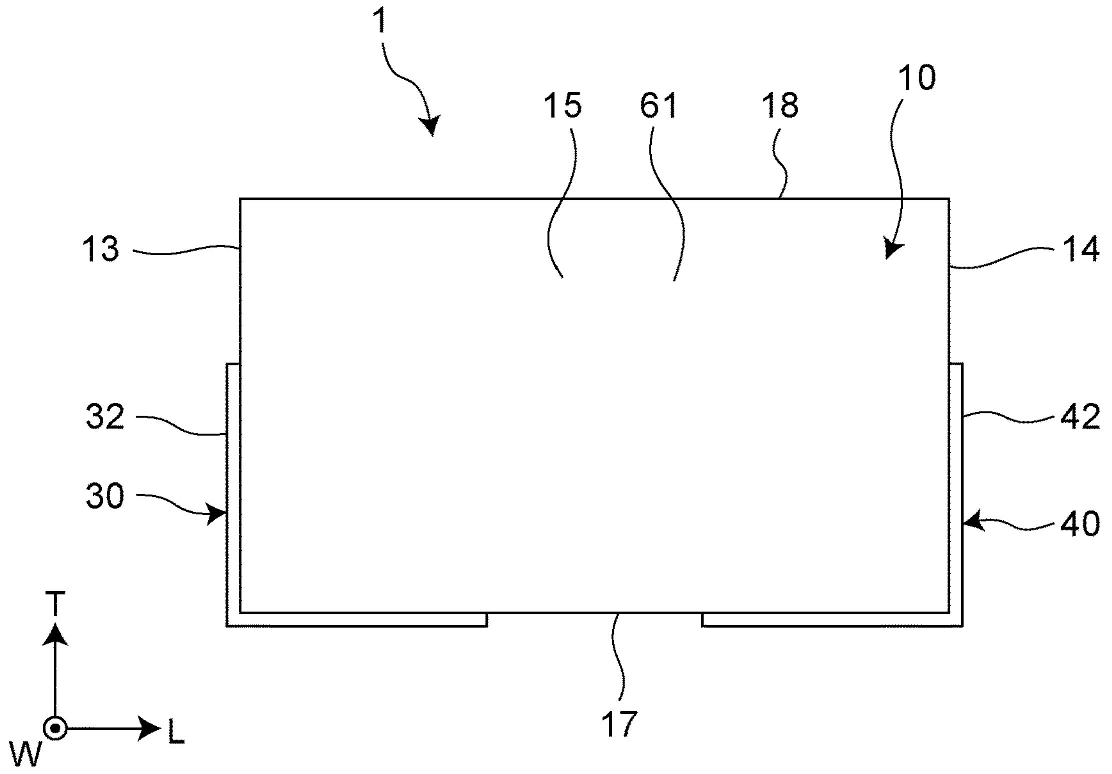
FIG. 4 is a front view of the inductor component.
Figure 5:
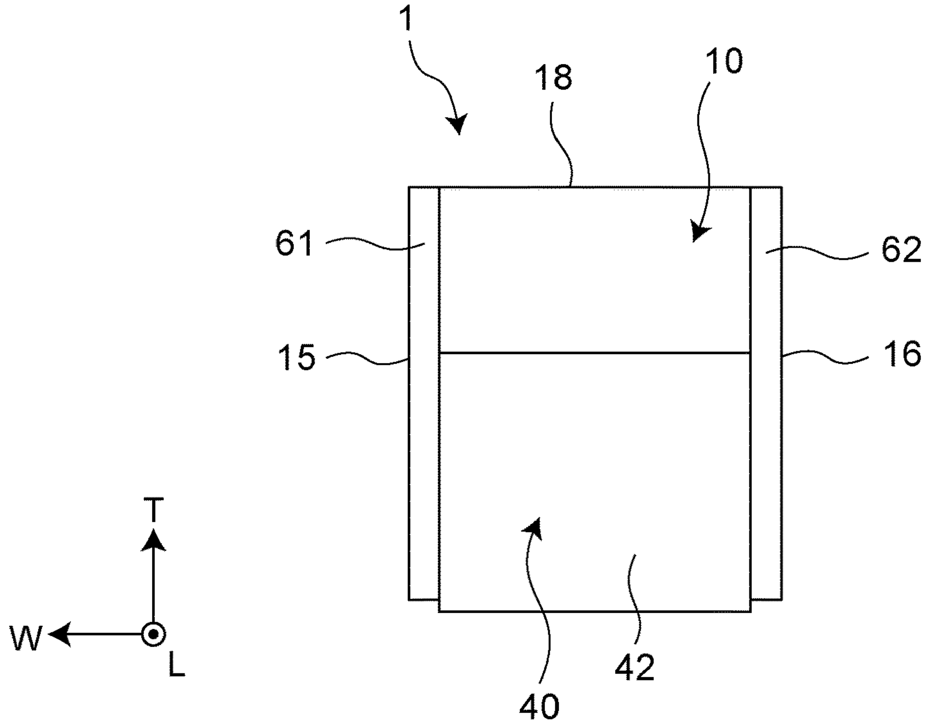
FIG. 5 is a side view of the inductor component.
Figure 6:
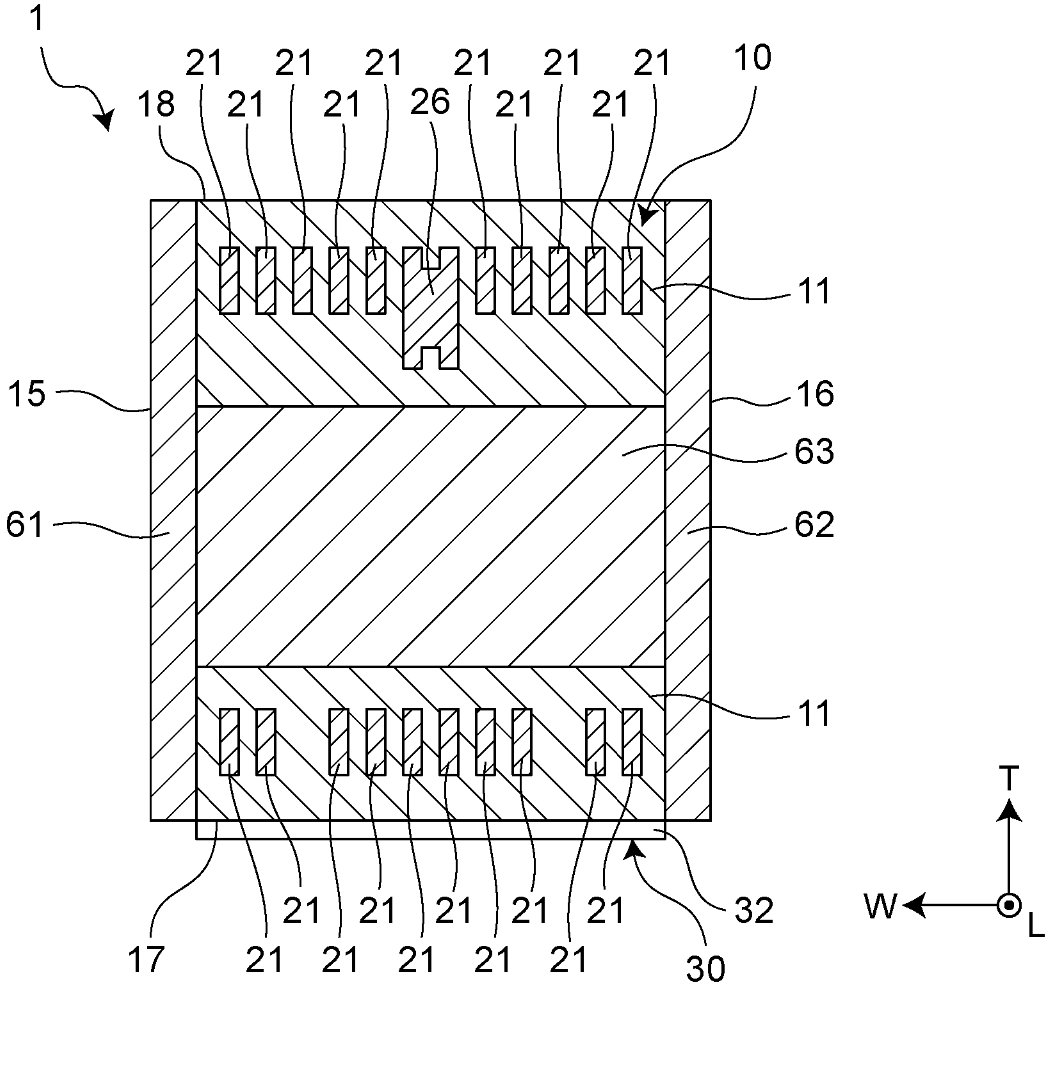
FIG. 6 is a sectional view of the inductor component taken along line X-X.
Figure 7:
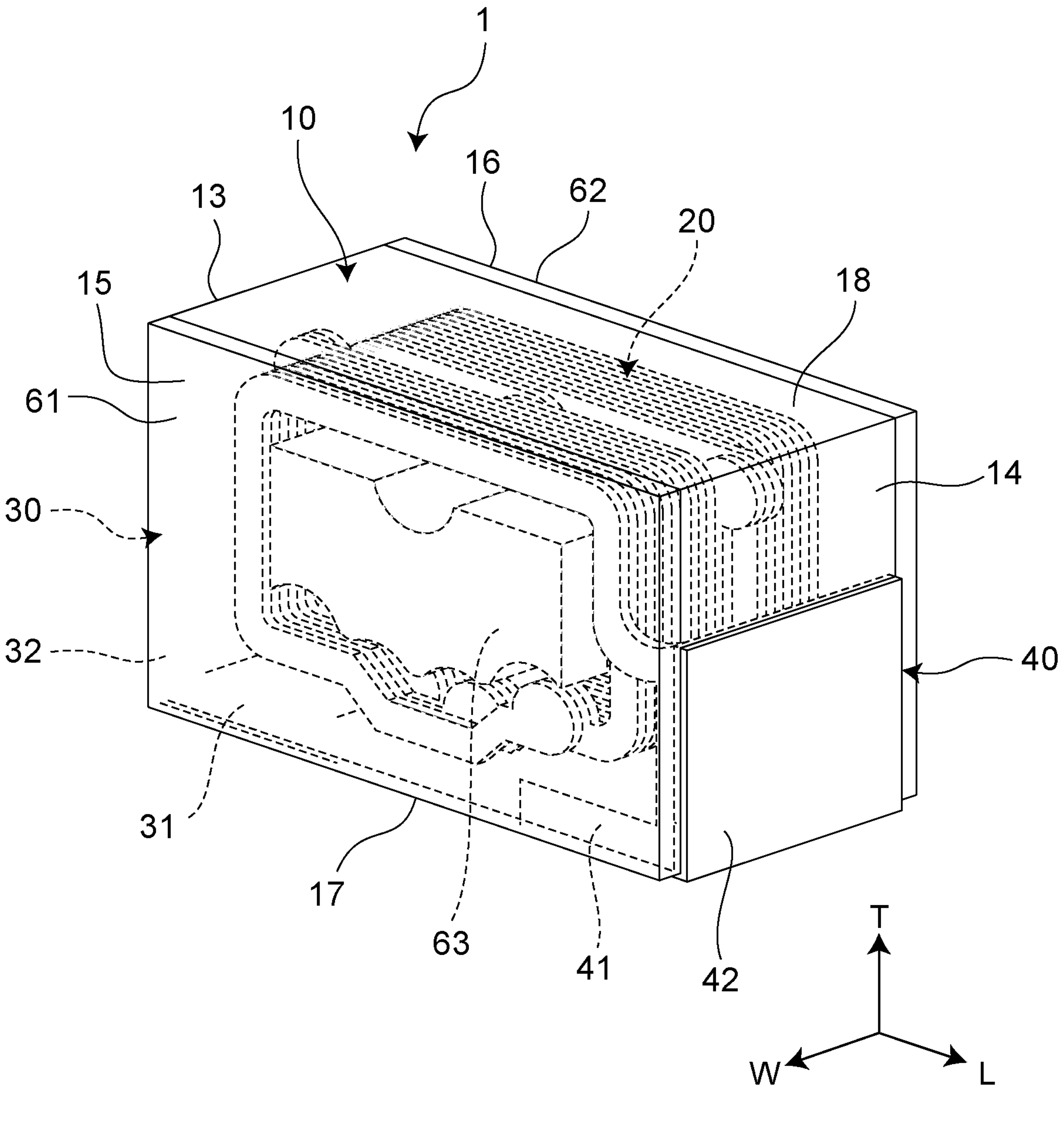
FIG. 7 is a transparent perspective view of the inductor component.
Figure 8:
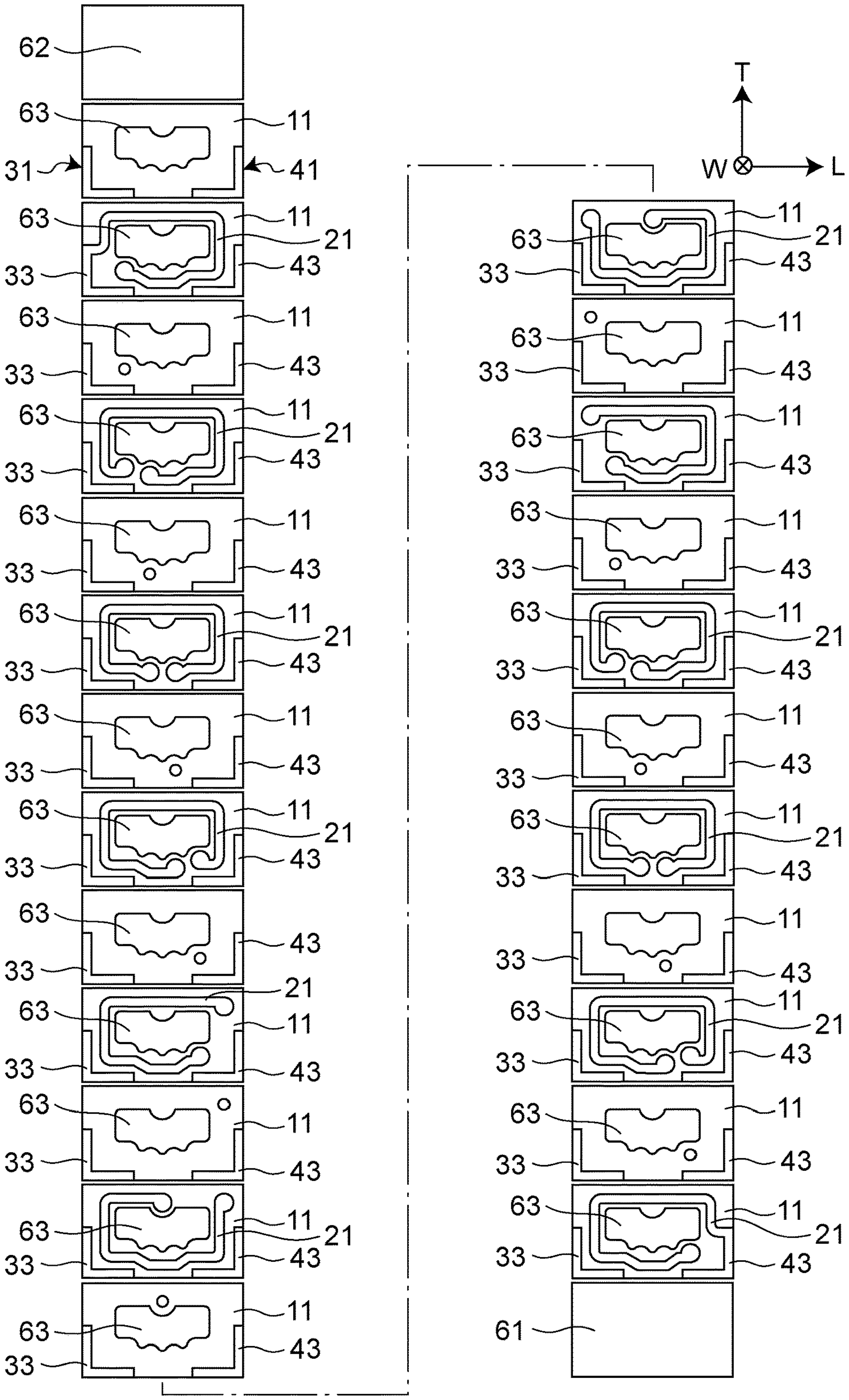
FIG. 8 is an exploded view of the inductor component.

FIG. 1 is a perspective view showing an inductor component 1 of a first embodiment. FIG. 2 is a bottom view of the inductor component 1. FIG. 3 is a top view of the inductor component 1. FIG. 4 is a front view of the inductor component 1. FIG. 5 is a side view of the inductor component 1. FIG. 6 is a sectional view of the inductor component 1 taken along line X-X in FIG. 3. FIG. 7 is a transparent perspective view of the inductor component 1. FIG. 8 is an exploded view of the inductor component 1.

As shown in FIGS. 1 to 8, the inductor component 1 comprises an element body 10, a coil 20 disposed on the element body 10, and a first external electrode 30 and a second external electrode 40 that are disposed on the element body 10 and electrically connected to the coil.

The inductor component 1 is electrically connected via the first and second external electrodes 30 and 40 to wiring of a circuit board not shown. The inductor component 1 is used e.g. as an impedance matching coil of a high-frequency circuit and is used for electronic devices such as personal computers, DVD players, digital cameras, TVs, mobile phones, car electronics, and medical/industrial machinery. However, the application of the inductor component 1 is not limited thereto. For example, the inductor component 1 can also be used in tuning circuits, filter circuits, rectifying and smoothing circuits, etc.

The element body 10 is constructed by laminating a plurality of insulating layers 11 made of a non-magnetic material. The insulating layer 11 contains glass for example. More specifically, the insulating layer 11 is formed from a glass sintered body. Examples of the glass include borosilicate glass. The insulating layer 11 may further contain non-magnetic ferrite, alumina, resin, and the like. The plurality of insulating layers 11 are laminated in W direction. The insulating layers 11 are laminated on an L-T plane perpendicular to the lamination direction in W direction. In the plurality of insulating layers 11, the interface between two adjacent insulating layers 11 may not be clear due to firing, etc.

The element body 10 is formed in a substantially rectangular parallelepiped shape. The element body 10 includes: a first end surface 13 and a second end surface 14 that face each other; a third end surface 15 and a fourth end surface 16 that face each other, a bottom surface 17 connected between the first end surface 13 and the second end surface 14 and between the third end surface 15 and the fourth end surface 16; and a top surface 18 facing the bottom surface 17. In other words, the exterior surface of the element body 10 is composed of: the first end surface 13; the second end surface 14 facing the first end surface 13; the third end surface 15 connected between the first end surface 13 and the second end surface 14; the fourth end surface 16 facing the third end surface 15; the bottom surface 17 connected between the third end surface 15 and the fourth end surface 16; and the top surface 18 facing the bottom surface 17. As shown, L direction is a direction perpendicular to the first end surface 13 and the second end surface 14; W direction is a direction perpendicular to the third end surface 15 and the fourth end surface 16; and T direction is a direction perpendicular to the bottom surface 17 and the top surface 18. L direction, W direction, and T direction are perpendicular to one another.

The coil 20 is parallel in its axial direction to the bottom surface 17 of the element body 10 and has a helical structure in which the coil is wound along the axial direction so as to intersect the third end surface 15 and the fourth end surface 16 of the element body 10. More specifically, in the inductor component 1, the axial direction of the coil 10 is parallel to W direction, that is, the axial direction of the coil 10 is parallel to the first end surface 13, the second end surface 14, the bottom surface 17, and the top surface 18, and is perpendicular to the third end surface 15 and the fourth end surface 16.

The coil 20 is formed in a substantially rectangular shape when viewed from the axial direction, but is not limited to this shape. The shape of the coil 20 may be circular, elliptical, rectangular, or any other polygonal shape. The axial direction of the coil 20 refers to a direction parallel to the central axis of the spiral around which the coil 20 is wound. The axial direction of the coil 20 and the lamination direction of the insulating layers 11 are the same direction. "Parallel" in the present application is not limited to a strict parallel relationship and includes a substantial parallel relationship taking a realistic range of variability into consideration.

The coil 20 includes a plurality of coil wirings 21 wound along a plane. The plurality of coil wirings 21 are laminated and arranged along the axial direction. The coil wirings 21 are formed wound on main surfaces (L-T planes) of the insulating layers 11 perpendicular to the axial direction. In other words, the coil wirings 21 are each wound in a direction perpendicular to the axial direction. The coil wirings 21 adjacent in the lamination direction are electrically connected in series through via wirings 26 passing through the insulating layers 11 in the thickness direction (W direction). The coil 20 thus includes the coil wirings 21 and the via wirings 26. In this manner, the plurality of coil wirings 21 make up a spiral while being electrically connected in series to each other. Specifically, the coil 20 has a configuration in which there are laminated the plurality of coil wirings 21 electrically connected in series to each other and each having less than one turn. The coil wiring 21 is composed of one coil conductor layer. The coil wiring 21 may be composed of a plurality of coil conductor layers that are laminated in surface contact with each other. In this case, the coil wiring 21 with a high aspect ratio and a high rectangularity can be formed. The coil wiring 21 may be of a spiral shape having one or more turns.

The coil 20 contains Ag. The coil 20 may contain glass and a conductive material (e.g. Cu, Au, etc.) other than Ag.

The first external electrode 30 has an L shape disposed over the first end surface 13 and the bottom surface 17. The second external electrode 40 has an L shape disposed over the second end surface 14 and the bottom surface 17. This means that both the first and second external electrodes 30 and 40 are exposed on the bottom surface 17. The first external electrode 30 is connected to a first end of the coil 20, while the second external electrode 40 is connected to a second end of the coil 20. The first external electrode 30 consists of two layers i.e. a base electrode layer 31 and a plating film layer 32. The second external electrode 40 consists of two layers i.e. a base electrode layer 41 and a plating film layer 42. The base electrode layer 31 is composed of a plurality of external electrode conductor layers 33 that are laminated in surface contact with each other. The base electrode layer 41 is composed of a plurality of external electrode conductor layers 43 that are laminated in surface contact with each other. The base electrode layers 31 and 41 may be composed e.g. of glass particles and a conductive material such as Ag, Cu, and Au or may be made of the same material as that of the coil 20. The external electrode conductor layers 33 and 43 may be embedded in the element body 10 or may be formed on the outer surface of the element body 10. The plating film layers 32 and 42 are formed e.g. by plating of Ni, Sn, Au, Cu, etc. and, specifically, are formed by plating of Ni and Sn.

The element body 10 further includes a first external magnetic member 61, a second external magnetic member 62, and an internal magnetic member 63.

The first external magnetic member 61 and the second external magnetic member 62 as the external magnetic members are present outside of the coil 20 in the axial direction of the coil 20. The first external magnetic member 61 constitutes the third end surface 15 of the element body 10, and the second external magnetic member 62 constitutes the fourth end surface 16 of the element body 10. The first external magnetic member 61 and the second external magnetic member 62 contain a magnetic material and may be formed from a composite of resin and a magnetic material. As used herein, the magnetic member means a member containing a magnetic material and need not contain resin. For the purpose of insulation and protection, other members in insulating layers, etc. of a resin material or an inorganic material may be laminated (coated) on the outer surfaces of the first and second external magnetic members 61 and 62. The disposition of the other members makes it possible to suppress peeling and cracking of the first and second external magnetic members 61 and 62 and short circuit and current leakage between the first and second external electrodes 30 and 40.

The internal magnetic member 63 is connected to the first external magnetic member 61 and the second external magnetic member 62. The internal magnetic member 63 is present at a position where the coil 20 lies in the axial direction of the coil 20. That is, the internal magnetic member 63 is formed in the insulating layers 11 in which the coil wirings 21 and the via wirings 26 are formed. The internal magnetic member 63 contains a magnetic material and may be formed from a composite of resin and a magnetic material. The internal magnetic member 63 may be made of the same material as that of the first external magnetic member 61 and the second external magnetic member 62.

The inductor component 1 has a dimension of less than 0.7 mm in a direction parallel to the bottom surface 17 and perpendicular to the axial direction of the coil 20 and has dimensions of less than 0.4 mm in the axial direction of the coil 20. For example, the size (L direction×W direction×T direction) of the inductor component 1 is 0.6 mm×0.3 mm×0.3 mm, 0.4 mm×0.2 mm×0.2 mm, 0.2 mm×0.1 mm×0.1 mm, etc. The lengths in W direction and T direction need not be equal, and may be e.g. 0.4 mm×0.2 mm×0.3 mm, etc. The inductor component 1 is a high-frequency inductor component used in high-frequency circuits and has an L value of 100 nH or less. In the present disclosure, the high-frequency inductor component means an inductor component 1 having an SRF of 500 MHz or more. It is preferred that the SRF of the inductor component 1 be 1 GHz or more, which allows the inductor component 1 to be used in a wide variety of high-frequency circuits.

According to the above inductor component 1, to acquire the required L value while supporting miniaturization, the Q value can be improved while improving the acquisition efficiency of the L value per external size. The details will be described below.

Due to miniaturization, that is, reduction in the external size, the inductor component 1 cannot have increased inner coil diameter, rendering it difficult to acquire the L value. In other words, the acquisition efficiency of the L value per external size lowers. In this case, one of conceivable methods for acquiring the required L value is to increase the number of coil turns. However, increase of the number of coil turns leads to increased coil line length to heighten the DC electrical resistance value (R value), with the result that the Q value tends to be difficult to improve. The above tendency becomes stronger as the external size becomes smaller, such as the dimension of 0.7 mm or less in L direction and the dimension of 0.4 mm or less in W direction of the inductor component.

As another method for improving the L value acquisition efficiency, in inductor components other than ones for high frequencies, a magnetic material may be used for the element body. However, use of the magnetic material for the element body of the high-frequency inductor components results in an increased magnetic loss due to the magnetic material at high frequencies, rendering it difficult to improve the Q value. In this manner, when the L value acquisition efficiency is improved to acquire the required L value while supporting miniaturization in the high-frequency inductor components, the Q value has been difficult to improve.

Since use of the magnetic material for the element body is usually for the purpose of acquiring a large L value, it has not been assumed that the magnetic material is used for the element body in high-frequency inductor components with a relatively small L value of 100 nH or less. Similarly, due to Snoek's limit, the magnetic materials usable for high frequencies are limited to those with low magnetic permeability in which the effect of improving the L value acquisition efficiency is relatively low, which is one of the reasons why the magnetic materials have not been used for the element body in the high-frequency inductor components.

On the other hand, when dared to examine the configuration of the high-frequency inductor component in which the element body has a magnetic material, the inventors of the present application found out that the Q value can be improved in a specific configuration. Experiments performed by the inventors of the present application are as follows.

First, as a Reference Example of the high-frequency inductor component, similarly to the above embodiment, an inductor component was created that comprises the element body, the coil disposed within the element body, and the first and second external electrodes disposed on the element body and electrically connected to the coil. In the Reference Example, the first external electrode was formed over the first end surface and the bottom surface, while the second external electrode was formed over the second end surface and the bottom surface. The coil of the Reference Example had an axis parallel to the bottom surface and had a helical structure in which the coil is wound along its axial direction so as to cross the third end surface and the fourth end surface. In the Reference example, the coil contained Ag and the element body was made only of glass. The coil was formed to have an L value of 100 nH, with a dimension in L direction of 0.6 mm and a dimension in W direction of 0.3 mm.

Next, as a Comparative Example of the high-frequency inductor component, one was created in which the element body includes, in addition to the insulating layer made of glass, the internal magnetic member made of a magnetic material positioned inside of the both ends of the coil in W direction (coil axial direction). Furthermore, as an Example of the high-frequency inductor component, similarly to the above embodiment, one was created in which the element body includes, in addition to the insulating layer and the internal magnetic member, the first external magnetic member and the second external magnetic member made of a magnetic material positioned outside of the both ends of the coil in W direction. The Comparative Example and the Example had the same structure as that of the Reference Example, except for the structure of the magnetic member of the element body. In the Comparative Example and the Example, the high-frequency inductor component was created with the magnetic material having magnetic permeability (real part μ' of the complex magnetic permeability) varied from 1.2 to 4.

Figure 9A:
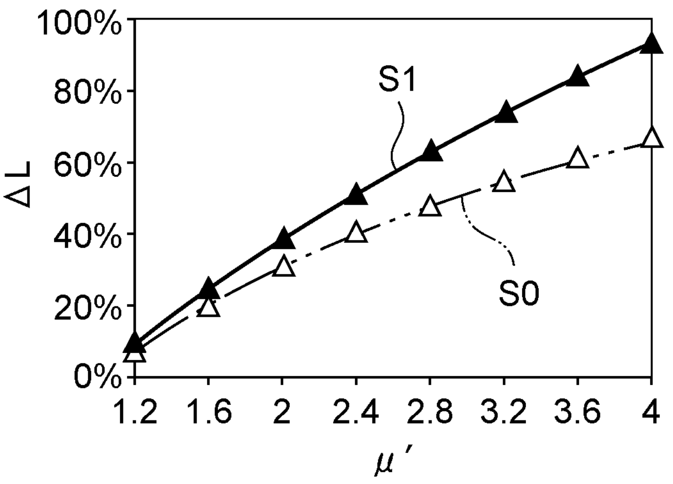
FIG. 9A is a diagram showing a relationship between the permeability and ΔL.
Figure 9B:
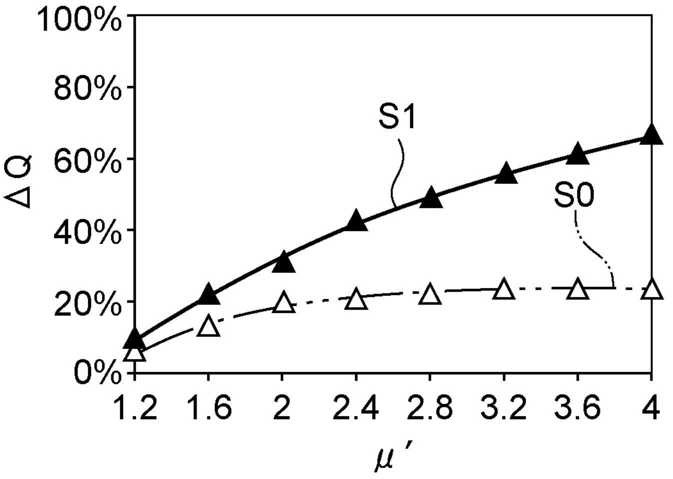
FIG. 9B is a diagram showing a relationship between the permeability and ΔQ.
Figure 9C:
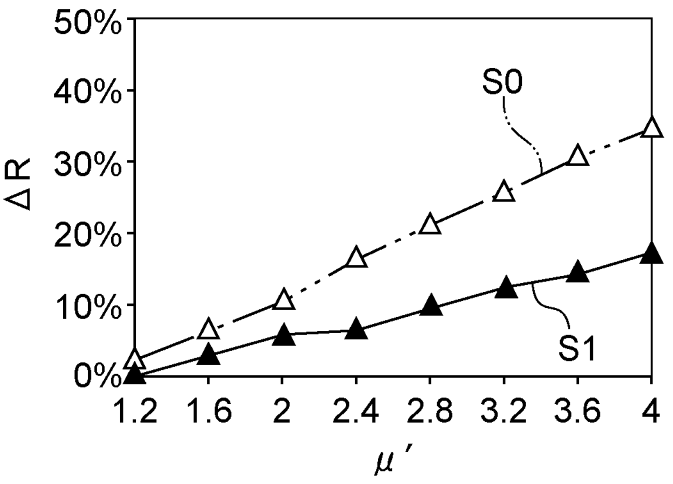
FIG. 9C is a diagram showing a relationship between the permeability and ΔR.

FIGS. 9A, 9B, and 9C are graphs respectively showing the rates of increase of the L value, Q value, and R value (let them be ΔL, ΔQ, and ΔR, respectively) of the Comparative Example and the Example, with the L value, Q value, and R value of the Reference Example being reference values (0%). Specifically, in FIGS. 9A, 9B, and 9C, the horizontal axes represent the magnetic permeability μ', while the vertical axes represent ΔL, ΔQ, and ΔR, respectively. ΔL indicates the rate of increase from the L value of the Reference Example (when μ' of the element body=1) not using the magnetic material. The same applies to ΔQ and ΔR. In FIGS. 9A, 9B, and 9C, graphs of the Example were designated by solid lines S1, while graphs of the Comparative Example were designated by chain double-dashed lines S0.

First, as shown in FIG. 9A, it can be seen that the L value increases as the magnetic permeability increases in both the Example and Comparative Example. As a whole, the L value of the Example is higher than that of the Comparative Example. This is due to the presence of the first and second external magnetic members, which allows the Example to have a larger ratio occupied by the magnetic members than the Comparative Example has in a path (magnetic path) through which the magnetic flux generated by current flowing through the coil goes around, consequently resulting in low reluctance and reduced leakage flux.

In the Comparative Example, however, as shown in FIG. 9B, the rate of increase of the Q value is reduced as the magnetic permeability increases, and when a certain magnetic permeability (μ'=2 to 3) is exceeded, the Q value does not increase. This is because in the Comparative Example, as shown in FIG. 9C, the R value also increases as the magnetic permeability increases so that the influence of the increase of the L value on the Q value is canceled by the influence of the increase of the R value. On the other hand, in the Example, as shown in FIG. 9B, the Q value also increases as the magnetic permeability increases. This is because in the Example, as shown in FIG. 9C, the R value does not increase as much as in the Comparative Example even if the magnetic permeability becomes higher.

It can thus be seen also in the high-frequency inductor component that by disposing the internal magnetic member, the first external magnetic member, and the second external magnetic member that contain a magnetic material, in addition to the insulating layer, on the element body as in the Example, the Q value can be improved while improving the acquisition efficiency of the L value.

The following may be the reason why in the Comparative Example the R value increases as the magnetic permeability increases whereas in the Example the R value does not increase as much as in the Comparative Example even if the magnetic permeability becomes higher. The inventors of the present application checked the current density of the coil when a high-frequency signal was input in the Comparative Example and found out that current concentrates on sites at the both ends of the coil in W direction (coil axial direction), resulting a high current density. It was also confirmed that the sites have a higher current density as the magnetic permeability increases. When the current density becomes higher, the temperature rises at the sites and the electrical resistivity of the conductor goes up. It is thus presumed in the Comparative Example that increase of the magnetic permeability allows current to concentrate on the both ends of the coil in W direction, leading to increase of the R value.

On the other hand, when similarly checking the current density at the time of inputting the high-frequency signal in the Example, current concentration on the both sides of the coil in W direction was reduced as compared with the Comparative Example. That is, it can be seen that the first external magnetic member and the second external magnetic member positioned near the both ends of the coil has the function of relieving the current concentration on the both ends of the coil. It is thus presumed that in the Example the current concentration on the both ends of the coil in W direction due to increase of the magnetic permeability is relieved so that the R value does not increase as much as in the Comparative Example.

As above, in the inductor component 1 of this embodiment, by using the first external magnetic member 61 and the second external magnetic member 62 together with the internal magnetic member 63, it is possible to relieve the current concentration on the both ends of the coil 20 in W direction and to improve the Q value while improving the acquisition efficiently of the L value through reduction in the rate of increase of the R value with respect to the increase of the magnetic permeability.

Although as shown in FIG. 9A, the L value of the Example is higher than that of the Comparative Example throughout the range of the magnetic permeability varied, this may be because due to the presence of the first and second external magnetic members, the Example is allowed to have a larger ratio occupied by the magnetic members than the Comparative Example has in a path (magnetic path) through which the magnetic flux generated by current flowing through the coil goes around, consequently resulting in low reluctance and reduced leakage flux. In this manner, the Example can obtain a Q value higher than that of the Comparative Example not only by reducing the rate of increase of the R value but also by improving the rate of increase of the L value.

As shown in FIG. 8, preferably, in the first and second external magnetic members 61 and 62 and the internal magnetic member 63, the magnetic material includes at least one of Co-based ferrite, hexagonal ferrite, and magnetic metal powder with a particle diameter of 1 μm or less. Use of such a magnetic material enables the high-frequency characteristics to be kept while improving the Q value of the inductor component, due to less magnetic loss up to high frequencies as compared with the case of using a general magnetic material such as Ni—Zn ferrite. In the case where the above magnetic material is formed from a composite of resin and a magnetic material, the resin is e.g. an epoxy resin.

As shown in FIG. 8, preferably, in the case where the first and second external electrodes are embedded in the element body 10, the area of the insulating layer 11 is larger than the total area of the coil 20, the first external electrode 30, and the second external electrode 40 in a section perpendicular to the axial direction of the coil 20 and including the coil wirings 21 and the first and second external electrodes 30 and 40. Such a form enables reduction in the area of the conductor portions i.e. the total area of the coil 20 and the first and second external electrodes 30 and 40 in that section, making it possible to suppress lowering of Q and lowering of SRF at high frequencies due to eddy current loss generated by the magnetic flux incident on the conductors. The area of the insulating layer 11 need not be larger than the above total area at all of the sections, and the former only needs to be larger than the latter at at least one section.

Figure 10:
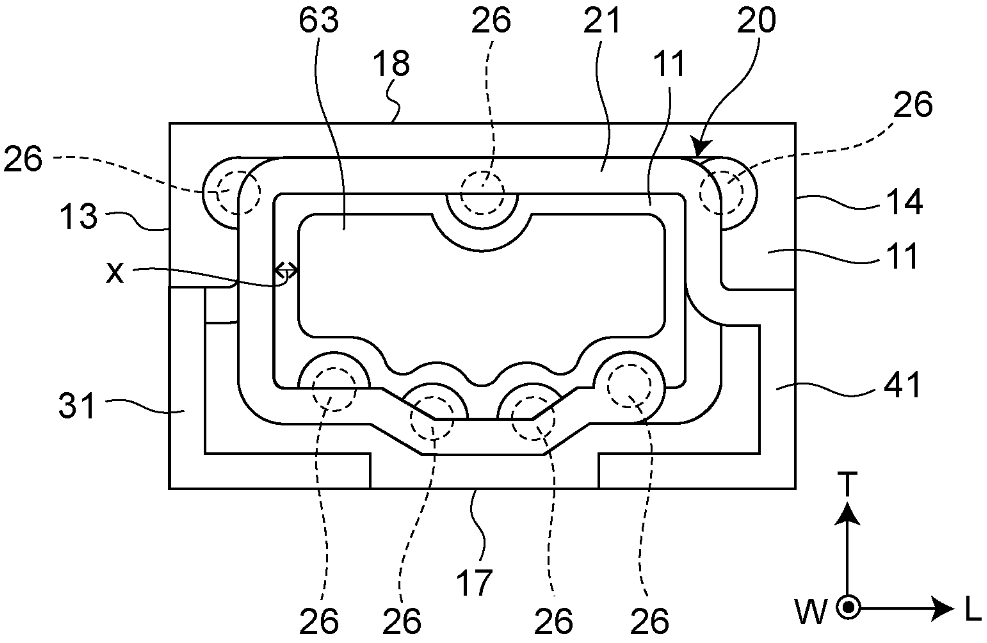
FIG. 10 is a transparent front view of the inductor component.

FIG. 10 is a transparent front view of portions of the inductor component 1 excepting the first and second external magnetic members 61 and 62 and the plating film layer 32 and 42. In the present disclosure, "front view" means a diagram of the inductor component 1 viewed from the lamination direction (W direction). In FIG. 10, the coil wirings 21 lie overlapping one another and surround a part of the insulating layer and the internal magnetic member 63. "Overlapping one another" includes the case where the coil wirings 21 have slight lamination misalignment due to manufacturing variations, etc. As shown in FIG. 10, the shortest distance x is 10 μm or more and 20 μm or less (i.e., from 10 μm to 20 μm) between the internal magnetic member 63 and the coil 20, specifically, between the outer peripheral surface of the internal magnetic member 63 and the inner peripheral surface of the coil 20 when the element body 10 and the coil 20 are projected on the third end surface 15 along the axial direction of the coil 20. At this time, a part of the insulating layer 11 lies between the outer peripheral surface of the internal magnetic member 63 and the inner peripheral surface of the coil 20. According to the above embodiment, since the shortest distance x is 20 μm or less, the Q value can further be raised by enlarging the area of the internal magnetic member 63. Since the shortest distance x is 10 μm or more, short circuit and current leakage via the internal magnetic member 63 can be suppressed through securing the distance between the coil 20 and the internal magnetic member 63. Due to the shortest distance of 10 μm or more, it becomes possible to reduce the influence of the magnetic loss on the internal magnetic member 63 at high frequencies to further improve the Q value.

Preferably, the internal magnetic member 63 lies only on the inner diameter side of the coil 20. According to the above embodiment, the internal magnetic member 63 is not present between the coil 20 and the first external electrode 30 and between the coil 20 and the second external electrode 40, making it possible to suppress lowering of SRF. Since the exterior of the coil 20 is formed integrally with the insulating layer 11, the strength of the inductor component 1 becomes higher. In addition, due to absence of the internal magnetic member 63 outside of the coil 20, the coil 20 can have a larger diameter.

Preferably, the dimension of the inductor component 1 in the direction (T direction) perpendicular to the bottom surface 17 of the element body 10 is larger than the dimension of the inductor component 1 in the axial direction (W direction) of the coil 20. Such a mode enables the coil 20 to have a larger inner diameter. The dimension of the inductor component 1 in the axial direction (W direction) of the coil 20 may be larger than the dimension of the inductor component 1 in the direction (T direction) perpendicular to the bottom surface 17 of the element body 10. Such a mode enables the number of turns of the coil 20 (in other words, the number of coil wirings 21) to be increased.

Preferably, when the element body 10 and the coil 20 are projected on the third end surface 15 along the axial direction of the coil 20, the internal magnetic member 63 has a shape extending along the coil 20. More specifically, the outer peripheral surface of the internal magnetic member 63 on the inner diameter side of the coil 20 has a shape corresponding to the inner peripheral surface of the coil 20. For example, the inner peripheral surface of the coil has an uneven shape, while the outer peripheral surface of the magnetic member has a shape along the uneven shape. This uneven shape may be formed by the ends i.e. via pats of the coil wirings 21. The above mode enables the internal magnetic member 63 to be enlarged.

Method of Manufacturing Inductor Component 1

An example of a method of manufacturing the inductor component 1 will next be described. The manufacturing method of the inductor component 1 is not limited to the following method, and another manufacturing method may be employed.

First, an insulating paste containing borosilicate glass as the main component and a conductive paste containing Ag as the main component are prepared. The insulating paste becomes insulating layers after firing described later. The conductive paste becomes coil wirings, the via wirings, and base electrode layers depending on the positions applied, after firing.

Next, the insulating paste is applied by screen printing, to form portions to be insulating layers. A required amount of conductive paste is applied by screen printing onto the insulating paste applied, to form portions to be the coil wirings and the base electrode layers by the patterning process by photolithography.

A required amount of insulating paste is applied by screen printing onto the insulating paste on which the conductive paste is applied and patterned. Furthermore, openings are disposed in the insulating paste by the patterning process by photolithography.

Next, a required amount of conductive paste is applied by screen printing onto the insulating paste disposed with the openings. At this time, the conductive paste is filled into the openings to thereby form portions to be the via wirings and the base electrode layers. Similarly to the above, the portions to be the coil wirings and the base electrode layers are formed by the patterning process by photolithography.

Next, a through hole for arranging the internal magnetic member therein is disposed on the inner diameter side of the coil wirings in a mother laminate, using laser, sandblasting, etc. The method of disposing the through hole may be a method of opening with photolithography, or a method in which dummy conductor is formed on the inner diameter side to open with metal etching. The mother laminate is then cut into a plurality of unfired laminates by dicing or the like. In the mother laminate cutting process, the portion to be the base electrode layer is exposed from the laminate on a cut surface formed by cutting.

Magnetic paste is then filled into the through hole to form the internal magnetic member, and thereafter magnetic paste is applied to the end surface of the laminate to form the external magnetic member.

Next, the unfired laminate is fired under predetermined conditions to obtain the coil wiring, the via wiring, and the base electrode layer from the conductive paste, obtain the insulating layer from the insulating paste, and obtain the internal magnetic member and the external magnetic member from the magnetic paste. In this manner, the element body having the insulating layer, the internal magnetic member, and external magnetic member is obtained.

Furthermore, barrel processing is applied to the element body and then Ni plating with a thickness of 2 μm to 10 μm and Sn plating with a thickness of 2 μm to 10 μm are formed on the portion of the base electrode layer exposed from the element body, to dispose the plating film layers thereon. Through the above processes, the inductor component 1 is completed.

Although in the above, the unfired laminate was fired, instead, after disposing the through hole in the mother laminate, the mother laminate may be fired and then magnetic paste may be filled into the through hole to form the internal magnetic member. In this case, after filling the magnetic paste, the mother laminate is cut into laminates by dicing or the like. In this case, the internal magnetic member and the external magnetic member can be formed by thermosetting the magnetic paste.

Second Embodiment

Figure 11:
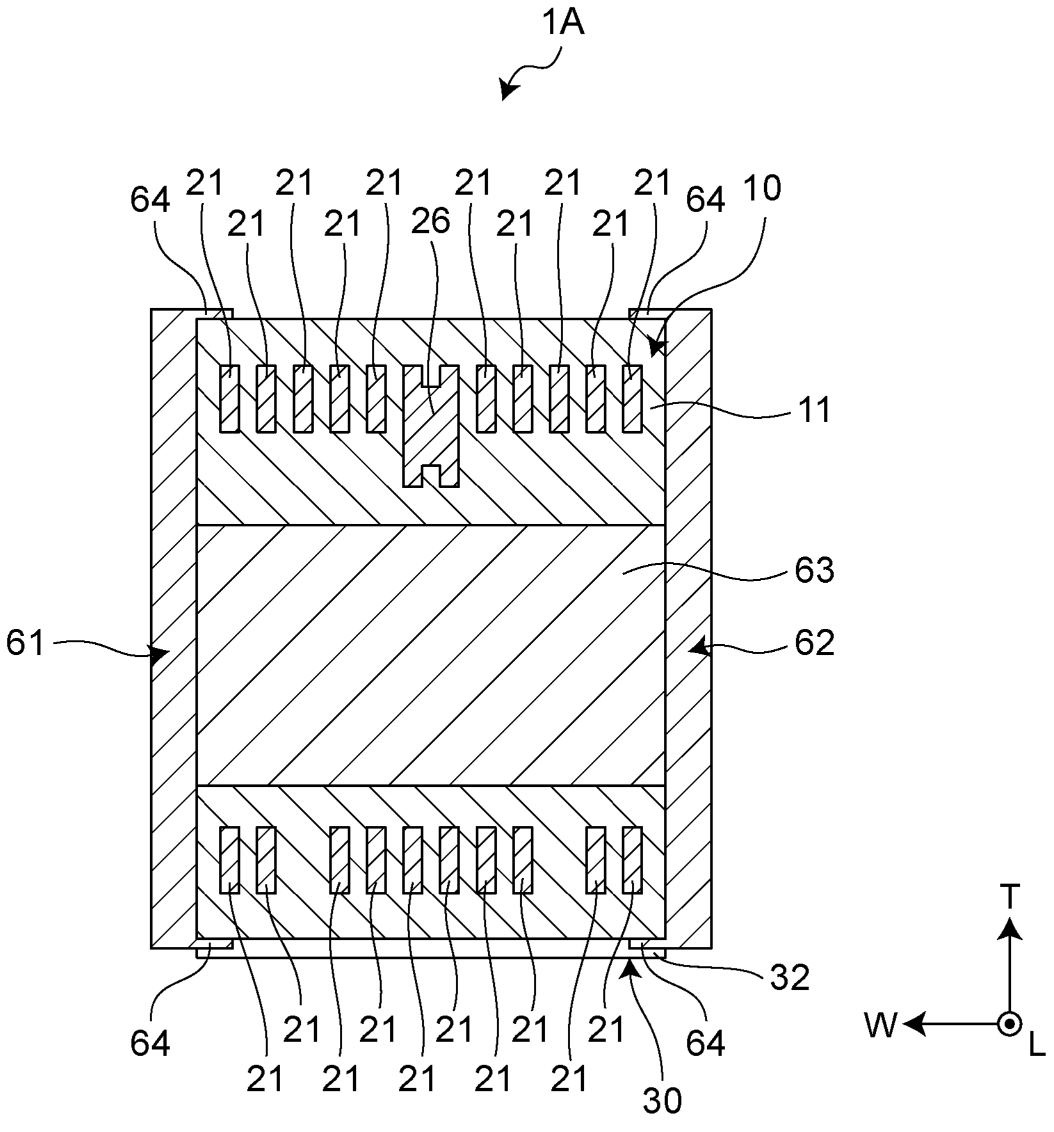
FIG. 11 is a sectional view showing an embodiment of the inductor component.

FIG. 11 is a sectional view in W-T direction of an inductor component 1A of a second embodiment. The inductor component 1A differs in the shape of the first and second external magnetic members from the inductor component 1 of the first embodiment. This difference will be described below. The other constituent elements are the same as those of the first embodiment and are designated by the same reference numerals as in the first embodiment, of which explanations will be omitted.

In the inductor component 1A, the first external magnetic member 61 extends over the respective insulating layers 11 of the bottom surface 17 and the top surface 18 of the element body 10. That is, extended portions 64 of the first external magnetic member 61 exist on the bottom surface 17 and the top surface 18 toward the third end surface 15. The second external magnetic member 61 extend over the respective insulating layers 11 of the bottom surface 17 and the top surface 18 of the element body 10. That is, extended portions 64 of the second external magnetic member 62 exist on the bottom surface 17 and the top surface 18 toward the fourth end surface 16. The above mode enables increase in the degree of adhesion between the first external magnetic member 61 and the element body 10 and between the second external magnetic member 62 and the element body 10. The first external magnetic member 61 may extend over the insulating layer 11 of at least one of the bottom surface 17, the top surface 18, the first end surface 13, and the second end surface 14 of the element body 10, while the second external magnetic member 62 may extend over the insulating layer 11 of at least one of the bottom surface 17, the top surface 18, the first end surface 13, and the second end surface 14 of the element body 10.

Method of Manufacturing Inductor Component 1A

An example of a method of manufacturing the inductor component 1A will next be described. The manufacturing method of the inductor component 1A is not limited to the following method, and another manufacturing method may be employed.

The inductor component 1A is manufactured in the same manner as that for the inductor component 1 until the formation of the mother laminate.

Next, a through hole 600 for arranging the internal magnetic member therein is disposed on the inner diameter side of the coil wirings in the mother laminate, using laser, sandblasting, etc. The mother laminate is then cut into a plurality of unfired laminates 100 by dicing or the like. In the mother laminate cutting process, the portion to be the base electrode layer is exposed from the laminate 100 on a cut surface formed by cutting.

Figure 12A:
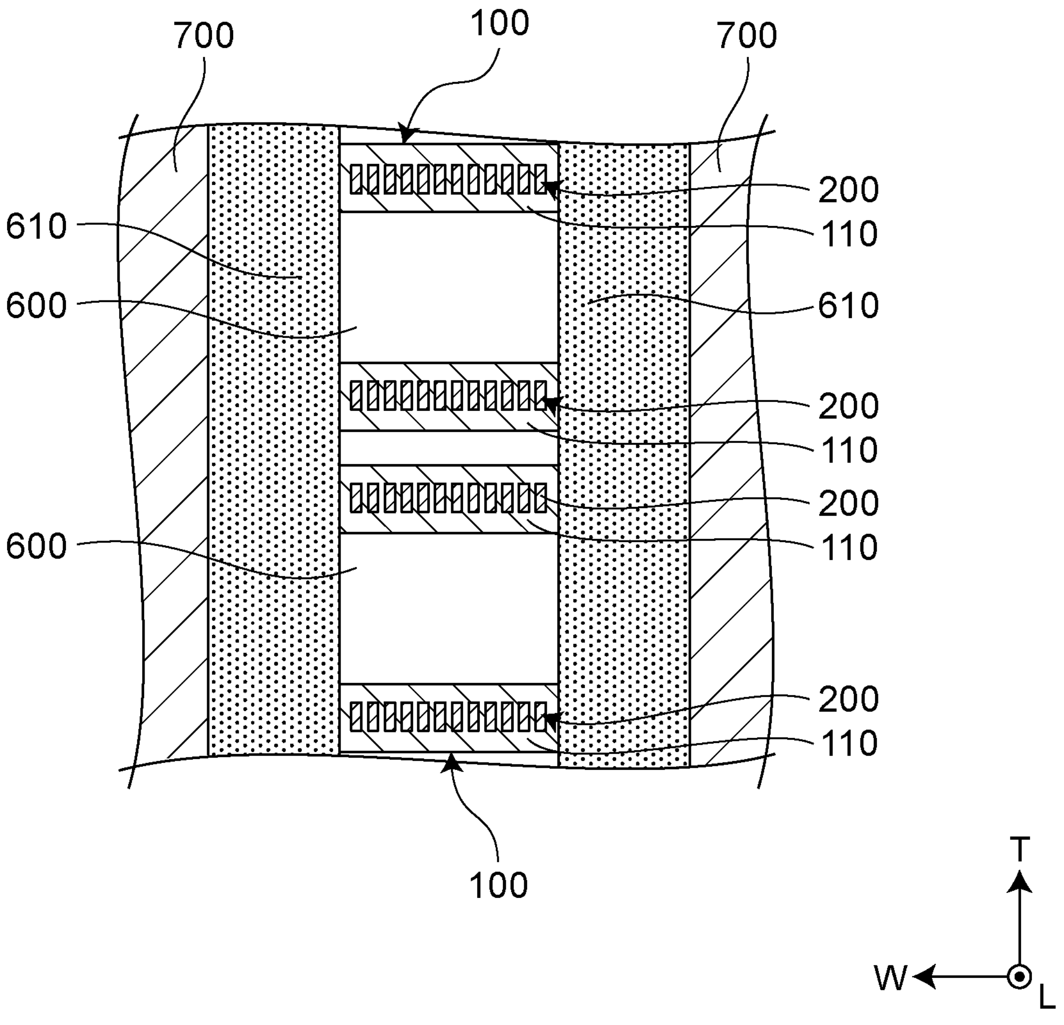
FIG. 12A is an explanatory view explaining a part of a method of manufacturing the inductor component of the embodiment.
Figure 12B:
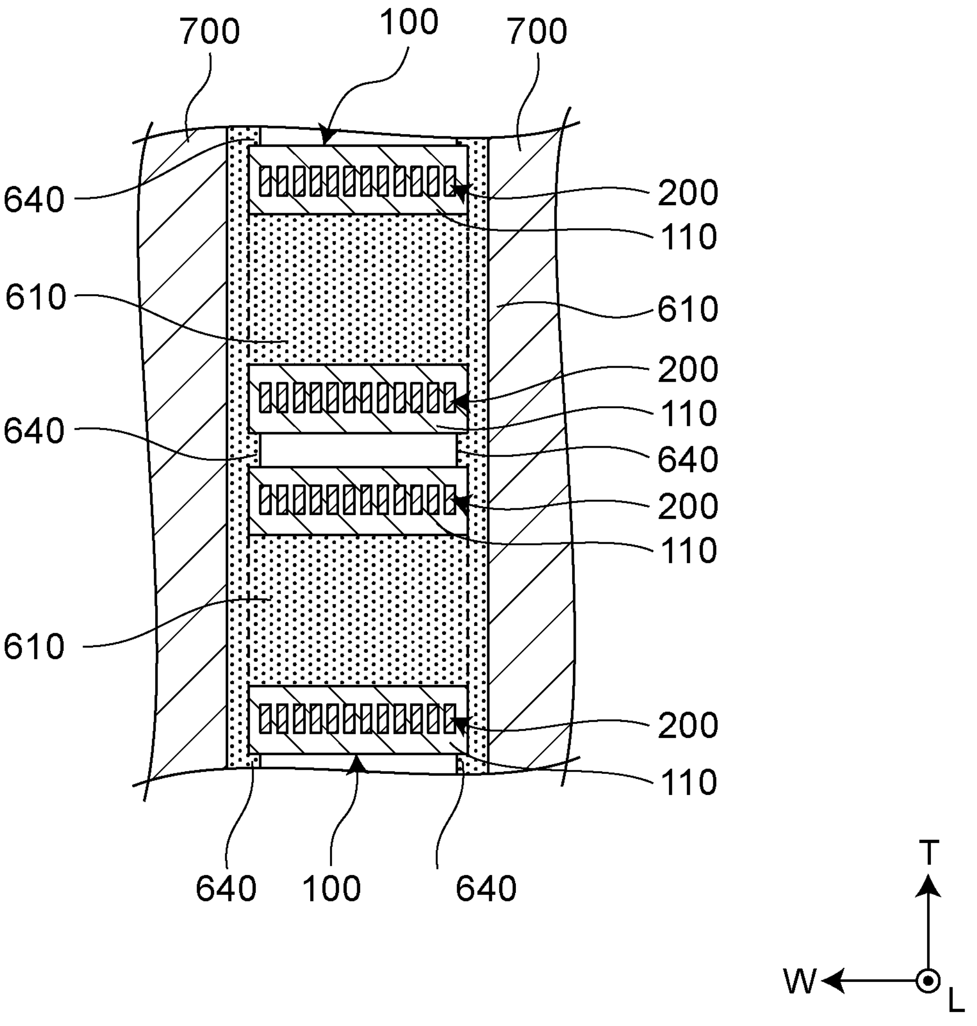
FIG. 12B is an explanatory view explaining a part of the method of manufacturing the inductor component of the embodiment.

Next, magnetic paste is filled into the through hole. A method of filling will be described below with reference to FIGS. 12A and 12B. FIG. 12A is an explanatory view for explaining a method of filling magnetic paste 610 into the through hole 600 of the inductor component 1A after cutting process and of disposing extensions 640 constituting the extended portions 64. FIG. 12B is an explanatory view for explaining the state where the through hole 600 has been filled with the magnetic paste 610, with the above extensions 640 having been disposed. In FIGS. 12A and 12B, the laminate 100 is represented as a schematic sectional view in W-T direction. The laminate 100 includes a coil portion 200, an element body portion 110, and the through hole 600, and the coil portion 200 and the element body portion 110 come to be the coil 20 and the element body 10, respectively, after firing.

As shown in FIG. 12A, the magnetic paste 610 is arranged on the both end surface of the laminate 100, which is sandwiched and pressed from both sides with a pair of dies 700. As shown in FIG. 12B, by pressing, apart of the magnetic paste 610 is filled into the through hole 600 to form the internal magnetic member; furthermore, a part of the magnetic paste 610 is left on the end surfaces of the laminate to form the external magnetic member; and furthermore, a part of the magnetic paste 610 is inserted into the opening side of the gap between the adjacent laminates 100, to consequently form the extensions 640.

Next, after removing the dies 700, the unfired laminate 100 is fired under predetermined conditions and thereafter the extension 640 is divided into two parts to separate adjacent laminates from each other. At this time, the separated two parts each form the extended portion 64. In this manner, the element body 10 is obtained that has the insulating layer 11, the internal magnetic member 63, and the first and second external magnetic members 61 and 62.

Next, similarly to the first embodiment, the barrel processing is applied to the element body 10 so that the plating film layers 32 and 42 are arranged by barrel plating, to thereby complete the inductor component 1A.

The present disclosure is not limited to the first and second embodiments described above and the design can be changed without departing from the gist of the present disclosure.

The materials are not limited to those exemplified above and publicly known ones can be used.

The magnetic paste may be filled into the through hole before cutting the mother laminate by dicing or the like. The magnetic paste may be filled in the state where only a part of the mother laminate has been cut, after which the mother laminate may be separated completely.

Although in the above embodiments the first and second external electrodes 30 and 40 have an L shape, they may be e.g. 5-sided electrodes. That is, the first external electrode may be disposed on the entire surface of the second end surface 14 and on a part of each of the third end surface 15, the fourth end surface 16, the bottom surface 17, and the top surface 18, while the second external electrode may be disposed on the entire surface of the first end surface 13 and on a part of each of the third end surface 15, the fourth end surface 16, the bottom surface 17, and the top surface 18.

What is claimed is:

1. A high-frequency inductor component comprising:
an element body;
a coil disposed within the element body and having a helical structure in which the coil is wound along an axial direction; and
a first external electrode and a second external electrode that are disposed on the element body and electrically connected to the coil,
the element body including a first end surface and a second end surface that face each other and a bottom surface connected between the first end surface and the second end surface,
the first external electrode extending from the first end surface to the bottom surface,
the second external electrode extending from the second end surface to the bottom surface,
the element body including an insulating layer made of a non-magnetic material, and an internal magnetic member and an external magnetic member that contain a magnetic material,
the internal magnetic member being at a position where the coil is present in the axial direction and having a shape with at least one concave recess that corresponds to an inner peripheral surface of the coil,
the external magnetic member being outside of the coil in the axial direction,
the inductor component having an inductance value of 100 nH or less.

2. The high-frequency inductor component of claim 1, wherein
the coil contains Ag, and
the insulating layer contains glass.

3. The high-frequency inductor component of claim 1, wherein
the axial direction is parallel to the bottom surface.

4. The high-frequency inductor component of claim 3, wherein
the inductor component has a dimension of less than 0.7 mm in a direction parallel to the bottom surface and perpendicular to the axial direction, and
the inductor component has a dimension of less than 0.4 mm in the axial direction.

5. The high-frequency inductor component of claim 3, wherein
the dimension of the inductor component in a direction perpendicular to the bottom surface is larger than the dimension of the inductor component in the axial direction.

6. The high-frequency inductor component of claim 1, wherein
the internal magnetic member and the external magnetic member are a composite of resin and the magnetic material.

7. The high-frequency inductor component of claim 1, wherein
the magnetic material includes at least one of Co-based ferrite, hexagonal ferrite, and magnetic metal powder with a particle diameter of 1 μm or less.

8. The high-frequency inductor component of claim 1, wherein
the first external electrode and the second external electrode are embedded in the element body,
the coil has a plurality of coil windings juxtaposed in the axial direction and each wound in a direction perpendicular to the axial direction, and
the area of the insulating layer is larger than the total area of the coil wirings, the first external electrode, and the second external electrode in a section perpendicular to the axial direction and including the coil wirings, the first external electrode, and the second external electrode.

9. The high-frequency inductor component of claim 1, wherein
when the element body and the coil are projected in the axial direction, the shortest distance between the internal magnetic member and the coil is from 10 μm to 20 μm.

10. The high-frequency inductor component of claim 1, wherein
the internal magnetic member lies only on the inner diameter side of the coil.

11. The high-frequency inductor component of claim 1, wherein the element body includes a third end surface and a fourth end surface that are perpendicular to the first end surface and the bottom surface and that face each other, the axial direction is parallel to the bottom surface and intersects the third end surface and the fourth end surface, and the external magnetic member constitutes the third end surface and the fourth end surface.

12. The high-frequency inductor component of claim 1, wherein the axial direction is parallel to the bottom surface and the first end surface, the element body includes a top surface facing the bottom surface, and the external magnetic member extends over the insulating layer on at least one of the bottom surface, the top surface, the first end surface, and the second end surface.

13. The high-frequency inductor component of claim 1, wherein when the element body and the coil are projected in the axial direction, the shape of the internal magnetic member extends along the coil.

14. The high-frequency inductor component of claim 1, wherein a self-resonant frequency of the high-frequency inductor component is 1 GH or more.

15. The high-frequency inductor component of claim 2, wherein the axial direction is parallel to the bottom surface.

16. The high-frequency inductor component of claim 4, wherein the dimension of the inductor component in a direction perpendicular to the bottom surface is larger than the dimension of the inductor component in the axial direction.

17. The high-frequency inductor component of claim 2, wherein the internal magnetic member and the external magnetic member are a composite of resin and the magnetic material.

18. The high-frequency inductor component of claim 2, wherein the magnetic material includes at least one of Co-based ferrite, hexagonal ferrite, and magnetic metal powder with a particle diameter of 1 μm or less.

19. The high-frequency inductor component of claim 2, wherein the first external electrode and the second external electrode are embedded in the element body, the coil has a plurality of coil windings juxtaposed in the axial direction and each wound in a direction perpendicular to the axial direction, and the area of the insulating layer is larger than the total area of the coil wirings, the first external electrode, and the second external electrode in a section perpendicular to the axial direction and including the coil wirings, the first external electrode, and the second external electrode.

20. The high-frequency inductor component of claim 2, wherein when the element body and the coil are projected in the axial direction, the shortest distance between the internal magnetic member and the coil is from 10 μm to 20 μm.

* * * * *